(12) United States Patent
Materne et al.

(10) Patent No.: US 6,313,220 B1
(45) Date of Patent: Nov. 6, 2001

(54) PREPARATION OF REINFORCED ELASTOMER, ELASTOMER COMPOSITE, AND TIRE HAVING COMPONENT THEREOF

(76) Inventors: Thierry Florent Edme Materne, 103, rue des 4 Vents, B-6700 Viville (BE); Daniel Edward Bowen, III, 143 Luden Ave., Munroe Falls, OH (US) 44262; Francois Kayser, 10 rue Alexandre Fleming, Luxembourg L-1525 (LU); Eric Sean Castner, 570 Knollwood Dr., Uniontown, OH (US) 44685

( * ) Notice: Subject to any disclaimer, the term of this patent is extended or adjusted under 35 U.S.C. 154(b) by 0 days.

(21) Appl. No.: 09/518,570

(22) Filed: Mar. 3, 2000

(51) Int. Cl.$^7$ .............................. C08L 83/04; C08L 25/10
(52) U.S. Cl. .................. 524/863; 524/266; 524/268; 524/858; 524/860; 525/100; 525/15; 528/18; 528/34
(58) Field of Search ................................ 524/266, 268, 524/588, 858, 860, 863, 492, 493; 525/100, 105; 528/18, 34

(56) References Cited

U.S. PATENT DOCUMENTS 6,087,424 * 7/2000 Yamamoto et al. .
6,166,108 * 12/2000 Materne et al. .
6,177,505 * 1/2001 Yatsuyanagi et al. .

FOREIGN PATENT DOCUMENTS 6116440 4/1994 (JP) ................................ C08L/21/00
6145429 5/1994 (JP) ................................ C08L/21/00
9302152 11/1997 (JP) ................................ C08L/21/00

OTHER PUBLICATIONS

"Precipitation of Silica–Titania Mixed–Oxide Fillers Into Poly(dimethylsiloxane) Networks" by J. Wen and J. Mark, *Rubber Chemistry and Technology*, vol. 67, No. 5, pp. 806–819.
"The Effect of Bis(3–triethoxysilylpropyl) Tetrasulfide on Silica Reinforcement of Styrene– Butadiene Rubber" by Hashim et al, *Rubber Chemistry and Technology*, vol. 71, pp. 289–299.

* cited by examiner

*Primary Examiner*—Robet Dawson
*Assistant Examiner*—Marc S. Zimmer

(57) ABSTRACT

This invention relates to the preparation of an elastomer which contains a dispersion of a reinforcing system formed in situ within an elastomer host by the interaction of a telechelic hydroxy and/or alkoxy terminated polysiloxane and a reticulating agent having a moiety comprised of at least two alkoxy groups. The invention further includes a rubber composition of at least two elastomers wherein one of said elastomers is a pre-formed composite of elastomer and the in situ formed reinforcement system. A tire having a component of such rubber composition, particularly a tire tread, is specifically contemplated.

24 Claims, No Drawings

PREPARATION OF REINFORCED ELASTOMER, ELASTOMER COMPOSITE, AND TIRE HAVING COMPONENT THEREOF

FIELD

This invention relates to the preparation of an elastomer which contains a dispersion of a reinforcing system formed in situ within an elastomer host by the interaction of a telechelic hydroxy and/or alkoxy terminated polysiloxane and a reticulating agent having a moiety comprised of at least two alkoxy groups. The invention further includes a rubber composition of at least two elastomers wherein one of said elastomers is a pre-formed composite of elastomer and the in situ formed reinforcement system. A tire having a component of such rubber composition, particularly a tire tread, is specifically contemplated.

BACKGROUND OF THE INVENTION

Elastomers are conventionally reinforced with particulate reinforcing fillers such as, for example, carbon black and sometimes amorphous silica, usually precipitated silica.

However, it may sometimes be desired to create the silica reinforcement in situ within an elastomer host in order to gain benefits of an enhanced dispersion of silica reinforcement within the elastomer.

Historically, it has heretofore been proposed to use a sol-gel process of creating a dispersion of silica in polysiloxane polymers such as poly(dimethylsiloxane) or (PDMS) elastomer(s) by in-situ formation of silica from a base-catalyzed sol-gel conversion of tetraethylorthosilicate (TEOS). For example see "Precipitation of Silica-Titania Mixed-Oxide Fillers Into Poly(dimethylsiloxane) Networks" by J. Wen and J. Mark; *Rubber Chem and Tech.* (1994), volume 67, No.5, (pages 806–819).

Historically, a process of preparing rubber products has been suggested by mixing the TEOS with a solution of unvulcanized rubber in an organic solvent and subjecting it to a sol-gel condensation reaction to provide a finely powdered silica. For example, see Japanese patent application publication 93/02152.

Historically, a composition has been suggested as comprising a base rubber and globular silica made by a sol-gel method and having an average particle diameter of 10–30 microns and specific surface area of 400–700 square meters per gram. The composition is suggested for use in a flap of a tire. For example, see Japanese patent application publication 6145429.

Historically, a tread rubber composition has been proposed as a composition of a base rubber and spherical silica prepared by a sol-gel transformation. For example, see Japanese patent application publication 6116440 and corresponding Japanese patent publication 2591569.

Historically, an in-situ formation of silica from a sol-gel reaction of TEOS in an organic solution of styrene/butadiene rubber, onto which a bis(3-triethoxysilylpropyl) tetrasulfide has been previously grafted to form triethoxysilyl groups, has been reported. ("The Effect of Bis(3-triethoxysilylpropyl) Tetrasulfide on Silica Reinforcement of Styrene-Butadiene Rubber" by Hashim, et al, in *Rubber Chem & Tech.* 1998, Volume 71, Pages 289 through 299).

However, it is desired herein to provide an alternative process, and resulting product, of forming a filler reinforcement in situ within an elastomer host.

In the description of this invention, the term "phr" where used herein, and according to conventional practice, refers to "parts of a respective material per 100 parts by weight of rubber, or elastomer".

In the description of this invention, the terms "rubber" and "elastomer" if used herein, may be used interchangeably, unless otherwise prescribed. The terms "rubber composition", "compounded rubber" and "rubber compound", if used herein, are used interchangeably to refer to "rubber which has been blended or mixed with various ingredients and materials" and such terms are well known to those having skill in the rubber mixing or rubber compounding art.

SUMMARY AND PRACTICE OF THE INVENTION

In accordance with this invention, a method is provided for preparing an elastomer/reinforcement system composite, said reinforcement system being formed in situ within an elastomer host, which comprises:

(A) blending in an organic solvent solution of an elastomer host,
  (1) at least one telechelic hydroxy and/or alkoxy terminated polysiloxane,
  (2) at least one reticulating agent having a moiety which comprises at least two alkoxy groups, and
  (3) a catalytic amount of a catalyst to promote a reaction between said polysiloxane and said reticulating agent; allowing a catalyzed reaction to initiate and proceed between said polysiloxane and said reticulating agent within said elastomer host and to thereby form a reinforcement system for said elastomer host; and recovering said resulting composite; or (B) blending, in an internal rubber mixer,
  (1) at least one telechelic hydroxy and/or alkoxy terminated polysiloxane,
  (2) at least one reticulating agent having a moiety which comprises at least two alkoxy groups, and
  (3) a catalytic amount of a catalyst to promote a reaction between said polysiloxane and said reticulating agent; allowing a catalyzed reaction to initiate and proceed between said polysiloxane and said reticulating agent within said elastomer host and to thereby form a reinforcement system for said elastomer host; and recovering said resulting composite.

In one aspect, the in situ reaction may be conducted without an addition of water to the reaction system.

In the practice of the invention, said elastomer host may be selected from at least one of (1) homopolymers of conjugated dienes, copolymers of conjugated dienes, copolymers of conjugated diene with a vinyl aromatic compound, preferably selected from styrene and alpha-methylstyrene and more preferably styrene, (2) terpolymers of ethylene, propylene and a minor amount (e.g.: about 2 to about 8 weight percent) of a non-conjugated diene, and (3) a copolymer of isobutylene and a minor amount (e.g.: about 2 to about 10 weight percent) of a conjugated diene.

In the practice of this invention, said telechelic hydroxy and/or alkoxy terminated polysiloxane may be represented by the following general Formula (I):

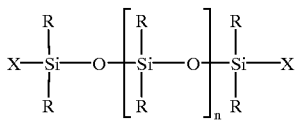

wherein R is the same or different alkyl radical selected from methyl, ethyl, n-propyl, isopropyl, n-butyl, and isobutyl radicals, preferably methyl radicals; wherein X is the same or different radical selected from hydroxyl and OR' (alkoxy) radicals, preferably hydroxyl radicals, wherein R' is selected from methyl, ethyl, n-propyl, isopropyl, n-butyl, and isobutyl radicals, preferably methyl radicals, and phenoxy radicals, where in R' is represented as $C_6H_{5-m}R''_m$, wherein R'' is a radical selected from methyl ethyl, n-propyl, isopropyl, n-butyl, and isobutyl; wherein m is from zero to five; and wherein n is zero or a number of from 2 to 500, alternatively from 1 to 200.

In the practice of this invention, said reticulating agent having a moiety comprised of at least two alkoxy groups is of at least one of the general formulas (IIA), (IIB), (IIC), (III), (IV) and (V):

$$M(OR^1)_x(R^2)_y \tag{IIA}$$

$$(R^1O)_x(R^2)_yM\text{—}O\text{—}M'(R^2)_z(R^2)_w \tag{IIB}$$

$$(R^1O)_x(R^2)_yM\text{—}(CH_2)_r\text{—}M'(R^2)_z(R^1)_w \tag{IIC}$$

wherein M and M' are the same or different and are selected from silicon, titanium, zirconium, boron, and aluminum, preferably silicon, where $R^1$ and $R^2$ are individually selected from radicals having from 1 to 10 carbon atoms, as alkyl radicals having from one to four carbon atoms, preferably from methyl, ethyl, n-propyl, isopropyl, n-butyl, and isobutyl radicals, and a phenyl radical, wherein $R^1$ is preferably an ethyl radical and $R^2$ is preferably a methyl radical, and wherein the sum of each of x+y and w+z integers is equal to 3 or 4 depending upon the valence of the associated M or M', as the case may be and is, therefore, 4 except when its associated M or M' is boron or aluminum for which it is 3, and wherein r is from 1 to 15, preferably from 1 to 6;

$$Z\text{—}R^3\text{—}S_j\text{—}R^3\text{—}Z \tag{III}$$

wherein j is a number in a range of from 2 to about 8 and the average for j is in a range of (A) about 2 to about 2.6 or (B) about 3.5 to about 4.5;

wherein Z is represented by the following formulas of which is preferably (Z3):

(Z1)

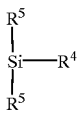

(Z2)

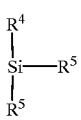

and (Z3)

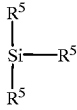

wherein $R^4$ is the same or different radical, and is individually selected from alkyl radicals having 1 to 4 carbon atoms and phenyl radical, preferably from methyl and ethyl radicals; $R^5$ is the same or different alkoxy groups, wherein the alkyl radicals of the alkoxy group(s) are individually selected from alkyl radicals having 1 to 4 carbon atoms, preferably from methyl, ethyl, n-propyl, isopropyl, n-butyl, and isobutyl radicals, preferably an ethyl radical, whereby (Z) is preferably (Z3) as a triethoxysilane radical; and $R^3$ is a radical selected from the group consisting of a substituted or unsubstituted alkyl radicals having a total of 1 to 18 carbon atoms, and a substituted or unsubstituted aryl radical having a total of 6 to 12 carbon atoms, wherein $R^3$ is preferably selected from ethyl, propyl, and butyl radicals;

$$(R^6O)_3\text{—}Si\text{—}R^7 \tag{IV}$$

where $R^6$ may be the same or different radicals alkyl radicals having from 1 to 4 carbon atoms selected from methyl, ethyl, n-propyl, and isopropyl radicals and as a phenyl radical, $R^7$ is selected from alkyl radicals having from 1 to 18, preferably from 8 to 18 carbon atoms, and aryl radicals or alkyl substituted aryl radicals having from 6 to 12 carbon atoms, wherein $R^7$ is preferably an alkyl radical; and $$(R^8O)_3\text{—}Si\text{—}(CH_2)_y\text{—}Y \tag{V}$$

wherein $R^8$ is the same or different alkyl radicals having from 1 to 4, preferably from 1 to 3 carbon atoms, selected from methyl, ethyl, n-propyl, and isopropyl radicals, preferably an ethyl radical, y is an integer of from 1 to 12, alternatively from 2 to 4, and Y is selected from primary amino, mercapto, epoxide, thiocyanato, vinyl, methacrylate, ureido, isocyanato and ethylene diamine radicals.

In a further practice of this invention a catalyst for stimulating a reaction between said telechelic hydroxy and/or alkoxy terminated polysiloxane and said reticulating agent having a moiety comprised of at least two alkoxy groups may be, for example, selected from at least one of dibutyltin dilaurate and tin 2-ethylhexanoate.

In particular, while dibutyltin dilaurate and tin 2-ethylhexanoate are the preferred catalysts, it is contemplated herein that catalysts of the general formula VI, VII, can be used.

$$Sn[Q(C(R^x))_a(C(H)_cH)_b(C(O))_dR^y]_2 \tag{VI}$$

wherein:
A. where Q is oxygen, a and b are zero, d is equal to one and $R^y$ is an alkyl radical containing from one to 25 carbon atoms.
B. where Q is oxygen and both a, b, and d are equal to one, c is zero and $R^x$ is the same or different as $R^y$, and $R^x$ equals hydrogen, methyl, $CF_3$, propyl butyl and/or phenyl radicals.

C. where Q is sulfur, a is zero and b, c, and d are one, and R$^y$ is an alkyl radical containing from one to 25 carbon atoms.

D. where Q is oxygen or sulfur, a, b, and d are zero and R$^y$ is an alkyl radical containing from one to 25 carbon atoms, $$R_2Sn[Q(C(R^x))_a(C(H)_cH)_b(C(O))_dR^y]_2 \qquad (VII)$$

wherein R$^z$ is an alkyl radical containing from one to 25 carbon atoms.

Representative examples of materials of formula VI are of the representative formulas:

$$Sn(OC(O)R)_2 \qquad \text{VI-A:}$$

$$Sn(SCH_2C(O)R)_2 \qquad \text{VI-B:}$$

$$Sn(OR)_2 \qquad \text{VI-C:}$$

Representative examples of materials of Formula VII are of the representative formulas:

$$R_2Sn(OC(O)R)_2 \qquad \text{VII-A:}$$

$$R_2Sn(SCH_2C(O)R)_2 \qquad \text{VII-B:}$$

$$R_2Sn(OR)_2 \qquad \text{VII-C:}$$

Representative examples of materials of Formula VI and VII are, for example: bis(neodecanoate)tin, diacetoxytin, di-n-butylbis(2-ethylhexanoate)tin, di-n-butylbis(2,4-pentanedionate)tin, di-n-butyldiacetoxytin, di-n-butyldiacrylatetin, di-n-butyldilauryltin, di-n-butyldimethacrylatetin, dimethyldineodecanoatetin, dioctyldilauryltin, dioctyldineodecanoatetin, stannous acetate, tin II hexafluoropentanedionate, and tin II 2,4-pentanedionate.

In further accordance with this invention, a rubber composition prepared according to said method(s) is provided.

In additional accordance with this invention, an article is provided having at least one component comprised of said rubber composition.

In further accordance with this invention, said article is selected from industrial belts and hoses.

In additional accordance with this invention, a tire is provided having at least one component comprised of said rubber composition.

In further accordance with this invention, a tire is provided having a tread comprised of said rubber composition.

It is important to appreciate that creation of a composite is accomplished by initiating a condensation reaction, which may be conducted in the absence of water, between the said telechelic hydroxy and/or alkoxy terminated polysiloxane and the reticulating agent with its plurality of alkoxy groups to form a reinforcement system within the elastomer host. Such reinforcement may be in a form of a network and/or particulate filler material.

It is to be appreciated that it is considered herein that the practice of this invention is a substantial departure from using a sol-gel method of creating a filler in situ within an elastomer host. Indeed, it is considered herein that the practice of this invention has an advantage over using a sol-gel method of creating a dispersed filler or filler network within an elastomer because (1) no water is needed to initiate coupling and (2) an overall formation of alcohol byproduct is reduced.

A significant aspect of the invention is the design, formation, and adaptation of a reinforcing network within an elastomer host through (1) selection of molecular weight (e.g.: length of polymer chain) of the said telechelic hydroxy and/alkoxy terminated polysiloxane (2) selection of "R" radicals of said telechelic hydroxy and/or alkoxy terminated polysiloxane to effect its solubility within the elastomer host and (3) adjustment of the amount of catalyst used.

This is considered herein as being beneficial for optimization of physical properties of the resulting composite such as, for example, its hysteresis, storage modulus (G') and loss modulus (G").

It is to be appreciated that reinforcement system formed by the in situ reaction of the telechelic hydroxy and/or alkoxy terminated polysiloxane of Formula (I) with the reticulating agent selected from one or more of the materials of Formulas (III) and (V) has a capability of further interaction with an elastomer, including the elastomer host, because of presence of the polysulfide bridge in the case of use of the material of Formula (III) and the presence of the specified radicals in the case of the use of the material of Formula (V).

It is to be appreciated that various additional reinforcing fillers may also be subsequently mixed with the elastomer/in-situ formed reinforcing filler composite.

For example, such additional fillers may be carbon black, precipitated silica and other fillers containing hydroxyl groups on their surface such as, for example, aluminum doped precipitated silica and modified carbon blacks, which would have aluminum hydroxide and/or silicon hydroxide on their respective surfaces.

Exemplary of such aluminum doped precipitated silicas are, for example aluminosilicates formed by a co-precipitation of a silicate and an aluminate. An example of modified carbon black is, for example, a carbon black having silicon hydroxide on its outer surface by treatment of carbon black with an organosilane at an elevated temperature or by co-fuming an organosilane and oil at an elevated temperature.

In the practice of this invention, if desired, about 5 to about 40 phr of a starch omposite may be added to, namely mixed with the rubber composition.

Thus, according to the process of this invention, about 5 to about 40 phr of a starch composite comprised of starch and plasticizer having hydroxyl groups thereof may be mixed with the rubber composition, preferably in a preparatory, non-productive mixing stage to a temperature in a range of about 130° C. to about 150° C., wherein said starch composite itself preferably has a softening point in a range of about 110° C. to about 160° C. according to ASTM test D1228.

Starch conventionally has a softening point in a range of about 180° C. to about 220° C. which is above normal rubber compound mixing temperatures. Accordingly, a composite of starch and plasticizer is used to provide a starch/plasticizer composite of the lower softening point range; wherein the plasticizer itself has a softening point below 180° C., and preferably below 160° C.

While various plasticizers may be used for the starch/plasticizer composite, a suitable plasticizer might be, for example, a poly(ethylene vinyl acetate), cellulose acetate and diesters of dibasic organic acids, so long as they have a softening point below 180° C., and preferably below 160° C.

Representative of such starch composites may be found, for example, in U.S. Pat. No. 5,672,639.

In further accordance with this invention, an elastomer blend composition is provided which is comprised of at least two diene-based elastomers of which one elastomer is a pre-formed elastomer/reinforcement system composite of this invention comprised of, based on 100 phr of elastomers, (A) about 10 to about 90 phr of at least one diene-based elastomer selected from at least one homopolymer and copolymer of isoprene and 1,3-butadiene, and a copolymer of at least one diene selected from isoprene and 1,3-butadiene with a vinyl aromatic compound selected from at least one of styrene and alpha-methylstyrene, preferably styrene, (B) about 90 to about 10 phr of at least one of said pre-formed composite of elastomer/filler, (C) at least one of additional reinforcing filler provided, however, that the total of said in-situ formed filler and said additional reinforcing filler are present in an mount of from about 30 to about 120 phr and where said additional reinforcing filler ay be selected, for example, from at least one of precipitated silica, aluminosilicate, carbon black and modified carbon black having hydroxyl groups, e.g.: hydroxyl and/or silicon hydroxide groups, on its surface and (D) optionally a coupling agent having a moiety reactive with said filler(s) and another moiety interactive with said elastomer(s).

In further accordance with this invention, an article is provided having at least one component comprised of said rubber blend composition.

In additional accordance with this invention, an article selected from industrial belts and hoses is provided having at least one component comprised of said rubber blend composition.

In further accordance with this invention, a tire is provided having at least one component comprised of said rubber blend composition.

In additional accordance with this invention, a tire is provided having a tread comprised of said rubber blend composition.

In practice, a representative example of a telechelic hydroxy terminated polysiloxane is, for example, a poly(dimethylsiloxane) having a primary hydroxyl group at each of its ends, namely two primary hydroxyl groups.

Representative examples of said reticulating agent materials of Formula (IIA), are, for example, tetraethoxylorthosilicate (TEOS), tetramethylorthosilicate (TMOS), which are the preferred reticulating agent materials; as well as; aluminum ethoxide, aluminum di-s-butoxide ethylacetoacetate, aluminum ethoxyethoxyethoxide, aluminum isopropoxide, aluminum n-butoxide, aluminum phenoxide, aluminum hydoxide, aluminum s-butoxide, aluminum t-butoxide, boron allyloxide, boron ethoxide, boron isopropoxide, boron methoxide, boron methoxyethoxide, boron n-butoxide tributylborate, boron n-propoxide, boron t-butoxide, boron trimethysiloxide, dimethyldiethylorthosilicate, dimethyldiethoxysilicate, hafnium ethoxide, hafnium n-butoxide, hafnium t-butoxide, methyltriethoxysilicate, tetra-n-propoxysilane, titanium ethoxide, titanium 2-ethylhexoxide, titanium isobutoxide, titanium isopropoxide, titanium methoxide, titanium methoxypropoxide, titanium n-butoxide, titanium n-nonyloxide, titanium n-propoxide, titanium stearyloxide, titanium triisostearylisopropoxide, titanium trimethylsiloxide, zirconium butoxide, zirconium ethoxide, zirconium hydroxide, zirconium isopropoxide, zirconium 2-methyl-2-butoxide, zirconium n-butoxide, zirconium n-propoxide, zirconium propoxide, zirconium t-butoxide, and zirconium trimethysiloxide.

Representative examples of said reticulating agent materials Formula (IIB), are, for example, di-s-butoxyaluminoxy triethoxysilane, and hexaethoxydisiloxane.

Representative examples of said reticulating agent materials Formula (IIC), are, for example, bis(triethoxysilyl) methane, and bis(triethoxysilyl) ethane.

Representative examples of reticulating agent materials, namely organosilane polysulfides, of Formula (III) are, for example:

(a) organosilane disulfide materials containing from 2 to 4 sulfur atoms, with an average of from 2 to 2.6, in their polysulfidic bridge, and (b) organosilane polysulfide materials containing from 2 to 8 sulfur atoms, with an average of from 3.5 to 4.5, in their polysulfidic bridge;

wherein, the alkyl radical for the alkoxy component of the disulfide and polysulfide materials selected from methyl, ethyl and propyl radicals, preferably an ethyl radical, and the alkyl radical for the silyl component is selected from ethyl, propyl, particularly n-propyl, and butyl radicals, preferably an n-propyl radical.

It is to be appreciated that the activity of the sulfur bridge of the organosilane disulfide material (a) and organosilane polysulfide material (b) is very different. In particular, the sulfur atoms of organosilane disulfide material (a), which is primarily a disulfide, have much stronger bonds to each other than the sulfur atoms in the bridge of the organosilane polysulfide material (b). Thus, the organosilane polysulfide material (b) can be somewhat of a sulfur donor (a provider of free sulfur) in a rubber composition at elevated temperatures whereas the sulfur atoms of the organosilane disulfide material (a) are not considered herein to be such a sulfur donor. This phenomenon can have a substantial effect upon a formulation of a sulfur curable rubber composition.

While a bis(3-alkoxysilylalkyl)polysulfide material such as, for example, a bis-(3-triethoxysilylpropyl)disulfide may be a preferable organosilane disulfide (a), representative examples of such organosilane disulfide (a) are 2,2'-bis(trimethoxysilylethyl)disulfide, 3,3'-bis(trimethoxysilylpropyl)disulfide, 3,3'-bis(triethoxysilylpropyl)disulfide, 2,2'-bis(triethoxysilylethyl) disulfide, 2,2'-bis(tripropoxysilylethyl)disulfide, 2,2'-bis(tri-sec.butoxysilylethyl)disulfide, 3,3'-bis(tri-t-butoxyethyl) disulfide, 3,3'-bis(triethoxysilylethyl tolylene)disulfide, 3,3'-bis(trimethoxysilylethyl tolylene)disulfide, 3,3'-bis (triisopropoxypropyl)disulfide, 3,3'-bis(trioctoxypropyl) disulfide, 2,2'-bis(2'-ethylhexoxysilylethyl)disulfide, 2,2'-bis (dimethoxy ethoxysilylethyl)disulfide, 3,3'-bis (methoxyethoxypropoxysilylpropyl) disulfide, 3,3'-bis (methoxy dimethylsilylpropyl)disulfide 3,3'-bis (cyclohexoxy dimethylsilylpropyl)disulfide, 4,4'-bis (trimethoxysilylbutyl)disulfide, 3,3'-bis(trimethoxysilyl-3-methylpropyl)disulfide, 3,3'-bis(tripropoxysilyl-3-methylpropyl)disulfide, 3,3'-bis(dimethoxy methylsilyl-3-ethylpropyl)disulfide, 3,3'-bis(trimethoxysilyl-2-methylpropyl)disulfide, 3,3'-bis(dimethoxyphenylsilyl-2-methylpropyl)disulfide, 3,3'-bis (trimethoxysilylcyclohexyl) disulfide, 12,12'-bis(trimethoxysilyldodecyl)disulfide, 12,12'-bis (triethoxysilyldodecyl)disulfide, 18,18'-bis (trimethoxysilyloctadecyl)disulfide, 18,18'-bis (methoxydimethylsilyloctadecyl) disulfide, 2,2-'-bis (trimethoxysilyl-2-methylethyl)disulfide, 2,2'-bis (triethoxysilyl-2-methylethyl)disulfide, 2,2'-bis (tripropoxysilyl-2-methylethyl)disulfide, and 2,2'-bis (trioctoxysilyl-2-methylethyl)disulfide.

Preferred of such organosilane disulfides are 3,3'-bis (trimethoxysilylpropyl) disulfide, 3,3'-bis (triethoxysilylpropyl)disulfide, 3,3'-bis(methoxy dimethylsilylpropyl) disulfide, and 3,3'-bis(cyclohexoxy dimethylsilylpropyl)disulfide.

While a bis(3-alkoxysilylalkyl)polysulfide material such as, for example, a bis-(3-triethoxysilylpropyl)tetrasulfide or trisulfide may be a preferable organosilane polysulfide (b), representative examples of such organosilane polysulfide (b) are bis-(3-trimethoxylsilylpropyl)trisulfide, bis-(3-trimethoxylsilylpropyl)tetrasulfide, bis-(3-triethoxysilylpropyl)trisulfide, bis-(3-triethoxysilylpropyl)tetrasulfide, bis-(3-triethoxysilylethyltolylene)trisulfide, and bis-(3-triethoxysilylethyltolylene)tetrasulfide.

For the alkyl alkoxysilane of Formula (IV) the said aryl or substituted aryl radicals may be, for example, benzyl, phenyl, tolyl, methyl tolyl, and alpha methyl tolyl radicals.

A purpose of the alkyl alkoxysilane is, for example, to design specific in-situ synthesized filler morphology and adhesion to the elastomer host matrix.

Representative examples of alkyl alkoxysilanes are, for example, but not intended to be limited to, propyltriethoxysilane, methyltriethoxy silane, hexadecyltriethoxysilane, and octadecyltriethoxysilane.

Representative examples of reticulating agent materials of Formula (V), as primary amino functional organosilanes are, for example, 3-amino propyl triethoxysilane, 2-aminoethyl triethoxysilane, and 4-aminobutyltriethoxysilane. Representative of mercapto functional organosilanes of Formula (V) are, for example, 3-mercapto propyl triethoxysilane, 2-mercaptoethyl triethoxysilane, and 4-mercaptobutyl triethoxysilane. Representative of epoxide functional organosilanes of Formula (V) is, for example, (3-glycidoxypropyl)triethoxysilane. Representative of thiocyanato functional organosilanes of Formula (V) is, for example, 3-thiocyanato propyl triethoxysilane. Representative of vinyl functional organosilanes is, for example, vinyltriethdxysilane. Representative of ureido radicals of Formula (V) is ureidopropyltriethoxysilane. Representative of isocyanato functional organosilanes of Formula (V) is, for example, 3-isocyanatopropyl triethoxysilane. Representative of ethylene diamine is N(3-triethoxysilyl)propyl ethylenediamine.

A purpose of the functional organosilane of Formula (V) is, for example, to aid in the adhesion of the filler to the elastomer host matrix.

Representative of elastomers for use in this invention are, for example, cis 1,4-polyisoprene, cis 1,4-polybutadiene, isoprene/butadiene copolymers, styrene/butadiene copolymers, including emulsion polymerization prepared copolymers and organic solvent solution polymerization prepared copolymers, styrene/isoprene copolymers, 3,4-polyisoprene, trans 1,4-polybutadiene, styrene/isoprene/butadiene terpolymer, high vinyl polybutadiene having from about 35 to about 90 percent vinyl groups, and mixtures thereof; as well, as terpolymers of ethylene, propylene, and minor amount of non-conjugated diene such as, for example, dicyclopentadiene, norbornene, and hexadiene, as well as, copolymers of isobutylene and a minor amount of conjugated diene such as, for example, isoprene and such copolymers which have been halogenated with boron or chlorine.

For the carbon black reinforcement having silicon hydroxide on the surface thereof, such modified carbon black may be prepared, for example, by treatment of a reinforcing carbon black with an organo silane at an elevated temperature or by co-fuming an organo silane and an oil, as hereinbefore discussed.

In the practice of this invention, as hereinbefore discussed, the in-situ formed reinforcement system may be formed in an elastomer host which is contained in an organic solvent solution or in a latex, preferably in an organic solvent solution.

For example, the elastomer may be provided in an organic solvent solution by, or example, (A) dissolving the elastomer in a suitable organic solvent, such as for example, toluene, hexane, cyclohexane, or THF (tetrahydrofurane) or (B) by providing the elastomer as a cement or polymerizate, namely in the solution resulting from an organic solvent solution polymerization of appropriate monomers to provide the elastomer in solution. Such organic solvent solution polymerization of monomers to obtain elastomers is well known to those having skill in such art.

Also, in the practice of this invention, the in-situ formed reinforcing system may also be formed by blending the elastomer and reinforcement system pre-cursor(s) and facilitating the said condensation reaction of the reinforcement system precursor in an internal rubber mixing apparatus such as, for example, an Banbury type of mixer or in an extruder. Internal rubber and polymer mixers are well known.

Thus, the internal mixer may be, for example, at least one internal batch mixer (e.g.: Banbury type of rubber mixer) in which the ingredients are introduced, sequentially introduced where appropriate into one or more sequential internal mixing steps and removed from the mixer after the mixing/reaction has reached a desired degree of completion.

Continuous reaction mixing techniques may be also be used. For example, a continuous extruder mixer may be used. Extruder mixers are usually presented as dual screw extruders in which the screws may revolve in a co-rotation mode or a counter rotation mode to each other and raised portions of their respective shafts may intermesh. It is preferred that the screw profile has an L/D (length over diameter) ratio in a range of from 5 to 70 to depending somewhat upon a desired mixing efficiency and degree of ingredient dispersion within the elastomer blend. Such reactive extruder mixing of various elastomers with various ingredients is well known to those having skill in such art. For example, see U.S. Pat. No. 5,711,904. For example, it is contemplated that the extruder may be a dual screw extruder where the elastomer host, filler precursor and condensation promoter are initially introduced into the extruder mixer and the optional organosilane is subsequently added to the reaction mixture within the extruder after about 50 to about 70 percent of the condensation reaction has occurred.

In the practice of this invention, various acidic or basic condensation promoters may be used and, in general, are understood to be well known to those having skill in such art. For example, representative of basic promoters are, for example, ammonia, ammonium hydroxide, N-butylamine, t-butylamine, butyl ammonium fluoride, sodium fluoride, various proteins linear polyamines such as, for example, pentaethylene hexamine, diaminopropane, diethylenetriamine, triethylenetetramine, and polyallylamines such as, for example, poly(allylaminehydrochloride), poly(L-lysine hydrobromide), poly(L-arginine hydrochloride), and poly(L-histidine hydrochloride). For example, representative of acidic promoters are phosphoric acid, formic acid, acetic acid, hydrofluoric acid and sulfuric acid.

Metal salts and metal oxides can also be used as promoters or inhibitors of silane condensation reactions (ie: Lewis acid or base reactions). Examples of metal salts are, for example zinc sulfate, aluminate sulfate, zinc stearate, and aluminum stearate. Examples of metal oxides are, for example, zinc oxide and aluminum oxide.

Typical catalysts for condensation reaction curing of silicon rubber might also be used. An examples is bis(2-ethylhexanoate) tin.

The actual selection of condensation promoter will depend somewhat upon whether the elastomer might be provided in an organic solvent solution or as a latex and can readily be determined by one having skill in such art.

Thus, the condensation reaction may be controlled by an acid or a base promoter, depending somewhat upon the kinetics of filler formation required and the in-situ filler structure desired.

For example, while individual circumstances may vary, an acid or base condensation reaction promoter, or any other suitable condensation reaction promoter, may be applied sequentially to promote, first, the alkoxy silane hydrolysis (acidic promoter) and then, secondly, the silane condensation reaction (basic promoter) leading to the actual in-situ filler formation.

A particular advantage in using the aforesaid pre-formed elastomer as a composite thereof which contains the in-situ formed reinforcement system within the elastomer composition is the reduction of mixing energy required to produce such a composite with optimum, homogeneous reinforcement system dispersion, namely a more homogeneous dispersion within the elastomer. This is desirable because it can both improve the processing of an elastomer composition during the mixing of the elastomer with other rubber compounding ingredients and, also various of the physical properties of the resulting rubber composition as well as various tire performances properties. Such improvements may be evidenced, for example in a reduction of a rubber composition's hysteresis and an improvement in a rubber composition's resistance to abrasion, apparently as a result of forming a more homogeneous dispersion of the in-situ formed reinforcement system and improvement in an efficiency of the interaction of the reinforcement system with the elastomer host which may be particularly significant for a tire tread rubber composition.

Other contemplated advantages, as hereinbefore discussed include, for example and depending upon reactions, a causation of the condensation without requiring an addition of water to the system as well as a reduction in alcohol formation during the condensation reaction.

In one aspect of the invention, it is desired that the rubber composition of pre-formed elastomer composite and additional elastomer(s) is worked by (A) thermomechanically mixing the composite, in at least two sequential mixing steps, with conventional compounding ingredients, all in the absence of curatives
   (i) to a maximum temperature in a range of about 160° C. to about 180° C. and for a duration of time, upon reaching said maximum temperature, in a range of about 1 to about 10 minutes at a temperature within about 5° C. to about 10° C. of said maximum temperature or
   (ii) to a maximum temperature in a range of about 155° C. to about 165° C. and for a duration of time upon reaching said maximum temperature, in a range of about four to about twenty minutes at a temperature within about 5° C. to about 10° C. of said maximum temperature, followed by (B) a final thermomechanical mixing step in which sulfur curatives and cure accelerators are mixed with said mixture for about one to about four minutes to a temperature of about 90° C. to about 120° C.; whereas the rubber mixture is cooled to a temperature below about 40° C. between each of the aforesaid mixing stages.

Depending somewhat upon the rotor speed of the mixer, the fill factor and the rubber composition itself, the time to reach the maximum temperature may range from about 2 to about 5 minutes. The term "fill factor" is believed to be well known to those having skill in such art as the portion of the volume of the internal mixer occupied by the rubber composition itself. Other parameters being equal, a rubber composition having a higher oil content will usually take a longer time to reach the maximum temperature.

In practice, an internal rubber mixer is preferred for the individual mixing steps.

In the recited mixing process the term "curatives" in intended to refer to rubber vulcanization curatives in a conventional sense, meaning sulfur together with accompanying sulfur vulcanization accelerators or perhaps, although not preferred, peroxide curatives might be used.

Classical rubber-reinforcing carbon blacks considered for use in this invention, including carbon blacks used for preparation of the carbon black composite, are, for example, carbon blacks having an Iodine Adsorption Number (ASTM test D15 10) in a range of about 30 to about 180 and sometimes even up to about 250 g/kg and a DBP (dibutylphthalate) Adsorption Number (ASTM test D2414) in a range of about 20 to about 150 cm$^3$/100 g. Representative examples of such carbon blacks, and references to associated ASTM test methods, may be found, for example, in *The Vanderbilt Rubber Handbook,* 1990 Edition on Pages 416 to 418.

The resultant physical properties obtained for rubber compositions of this will depend somewhat upon the carbon black composite used, the coupler used and the rubber composition itself.

The rubber composite itself can also be provided as being a sulfur cured composition through vulcanization of the uncured elastomer composition. The sulfur curing is accomplished in a conventional manner, namely, by curing under conditions of elevated temperature and pressure for a suitable period of time.

The curatives for sulfur curing the rubber composition are curatives conventionally used for sulfur curable elastomers which typically include sulfur and one or more appropriate cure accelerators and sometimes also a retarder. Such curatives and use thereof for sulfur curable elastomer compositions are well known to those skilled in the art.

Sequential mixing processes for preparing sulfur curable rubber compositions in which elastomers and associated ingredients exclusive of curatives are first mixed in one or more sequential steps, usually called a "non-productive mixing step(s)" followed by a final mixing step for adding curatives, usually called a "productive mixing step", are also well known to those skilled in the art.

In the practice of this invention, additional diene-based elastomers can be blended with the aforesaid elastomer composition such as homopolymers and copolymers of conjugated dienes and copolymers of conjugated diene(s) and vinyl aromatic compound. Such dienes may, for example, be selected from isoprene and 1,3-butadiene and such vinyl aromatic compounds may be selected from styrene and alphamethylstyrene. Such elastomer, or rubber, may be selected, for example, from at least one of cis 1,4-polyisoprene rubber (natural and/or synthetic, and preferably natural rubber), 3,4-polyisoprene rubber, styrene/butadiene copolymer rubbers, isoprenelbutadiene copolymer rubbers, styrene/isoprene copolymer rubbers, styrene/isoprene/butadiene terpolymer rubbers, cis 1,4-polybutadiene rubber, trans 1,4-polybutadiene rubber (70–95 percent trans), low vinyl polybutadiene rubber (10–30 percent vinyl), high vinyl polybutadiene rubber having from about 35 to about 90 percent vinyl 1,2-content, and emulsion polymerization prepared butadiene/acrylonitrile copolymers, as well as tin coupled and tin terminated elastomers, and functionalized (e.g.: end functionalized with alkoxysilyl or epoxy groups) solution polymerization prepared elastomers.

It is to be appreciated that additional silica, particularly precipitated silica, and/or carbon black might also be blended with the said composite of pre-formed reinforced elastomer and additional elastomer(s).

It is intended for the practice of this invention that the term "precipitated silica", when used herein, also includes precipitated aluminosilicates as a form of precipitated silica. The precipitated silicas are, for example, those obtained by the acidification of a soluble silicate, e.g. sodium silicate, generally exclusive of silica gels.

Such silicas might be characterized, for example, by having a BET surface area, as measured using nitrogen gas, preferably in the range of about 40 to about 600, and more usually in a range of about 50 to about 300 square meters per gram ($m^2/g$). The BET method of measuring surface area is described by Brunauer, Emmett and Teller: *Journal of American Chemical Society* (1938) Page 309. An additional reference might be DIN Method 66131.

The silica may also be typically characterized by having a DBP (dibutylphthalate) Absorption Number in a range of about 100 to about 400, and more usually about 150 to about 300 cc/100 g.

Various commercially available precipitated silicas may be considered for use in this invention such as, only for example herein, and without limitation, silicas commercially available from PPG Industries under the Hi-Sil trademark with designations 210, 243, etc; silicas available from Rhodia with, for example, Zeosil 1165MP and silicas available from Degussa AG with, for example, designations VN2 and VN3, BV3380GR, etc. and from Huber as Zeopol 8745 and Zeopol 8715.

Various couplers may be used and many are well known to those skilled in such art. For example bis(trialkoxysilylalkyl)polysulfides may be used which contain from two to about eight sulfur atoms in their polysulfidic bridge, with an average of about 2 to about 5 sulfur atoms. For example, the polysulfidic bridge may contain an average of from about 2 to 3 or 3.5 to 5 sulfur atoms. The alkyl groups may be selected, for example, from methyl, ethyl, and propyl groups. Therefore, a representative coupler might be, for example, a bis(triethoxysilylpropyl)polysulfide containing from 2 to 8, with an average of about 2 to about 5, sulfur atoms in its polysulfidic bridge.

It is to be appreciated that the coupler, if in a liquid form, might be used in conjunction with a carbon black carrier, namely, pre-mixed with a carbon black prior to the addition to the rubber composition, and such carbon black is usually to be included in the amount of carbon black accounted for in the rubber composition formulation.

It is readily understood by those having skill in the art that the rubber composition would be compounded by methods generally known in the rubber compounding art, such as mixing the various sulfur-vulcanizable constituent rubbers with various commonly used additive materials such as, for example, curing aids, such as sulfur, activators, retarders, and accelerators, processing additives, such as oils, resins including tackifying resins, silicas, and plasticizers, fillers, pigments, fatty acid, zinc oxide, waxes, antioxidants and antiozonants, peptizing agents, and reinforcing materials such as, for example, carbon black. As known to those skilled in the art, depending on the intended use of the sulfur vulcanizable and sulfur vulcanized material (rubbers), the additives mentioned above are selected and commonly used in conventional amounts.

In the preparation of the rubber composition typical amounts of tackifier resins, if used, comprise about 0.5 to about 10 phr, usually about 1 to about 5 phr. Typical amounts of processing aids comprise about 1 to about 50 phr. Such processing aids can include, for example, aromatic, napthenic, and/or paraffinic processing oils. Typical amounts of antioxidants comprise about 1 to about 5 phr. Representative antioxidants may be, for example, diphenyl-p-phenylenediamine and others such as, for example, those disclosed in *The Vanderbilt Rubber Handbook* (1978), Pages 344 through 346. Typical amounts of antiozonants comprise about 1 to 5 phr.

Typical amounts of fatty acids, if used, which can include stearic acid, palmitic acid, linoleic acid or mixtures of one or more fatty acids, can comprise about 0.5 to about 5 phr. Often stearic acid is used in a relatively impure state and is commonly referred to in the rubber compounding practice as "stearic acid" and is so referred to in the description and practice of this invention.

Typical amounts of zinc oxide comprise about 1 to about 5 phr. Typical amounts of waxes comprise about 1 to about 5 phr. Often microcrystalline waxes are used. Typical amounts of peptizers, if used, comprise about 0.1 to about 1 phr. Typical peptizers may be, for example, pentachlorothiophenol and dibenzamidodiphenyl disulfide.

The vulcanization is conducted in the presence of a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. As known to those skilled in the art, sulfur vulcanizing agents are used in an amount ranging from about 0.5 to about 4 phr, or even, in some circumstances, up to about 8 phr, with a range of from about 1 to about 2.5, sometimes from about 1 to about 2, being preferred.

Accelerators are used to control the time and/or temperature required for vulcanization and to improve the properties of the vulcanizate. In one embodiment, a single accelerator system may be used, i.e., primary accelerator. Conventionally and preferably, a primary accelerator(s) is used in total amounts ranging from about 0.5 to about 4, preferably about 0.8 to about 2, phr. In another embodiment, combinations of a primary and a secondary accelerator might be used with the secondary accelerator being used in amounts of about 0.05 to about 3 phr in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates, and xanthates. Preferably, the primary accelerator is a sulfenamide. If a second accelerator is used, the secondary accelerator is preferably a guanidine, dithiocarbamate or thiuram compound.

The presence and relative amounts of the above ingredients, other than carbon black and coupler, are not considered to be the primary subject of this invention which is more primarily directed to the preparation and use of the aforesaid pre-formed elastomer composite with the integral filler dispersion.

The ingredients are typically mixed in at least two stages, namely, at least one non-productive stage followed by a productive mix stage. The final curatives are typically mixed in the final stage which is conventionally called the "productive" mix stage in which the mixing typically occurs at a temperature, or ultimate temperature, lower than the mix temperature(s) than the preceding non-productive mix stage (s). The rubber, carbon black and coupling agent if used, are mixed in one or more non-productive mix stages. The terms "non-productive" and "productive" mix stages are well known to those having skill in the rubber mixing art.

In at least one of the non-productive (NP) mixing stages, the materials are thermomechanically mixed and the mixing temperature is allowed to reach a temperature of, for example, between 140° C. and 190° C.

The rubber composition of this invention can be used for various purposes. For example, it can be used for various tire compounds. Such tires can be built, shaped, molded and cured by various methods which are known and will be readily apparent to those having skill in such art.

The invention may be better understood by reference to the following examples in which the parts and percentages are by weight unless otherwise indicated.

EXAMPLE 1

An (SBR) elastomer cement is prepared by organic solvent (hexane) solution co-polymerization of styrene and 1,3-butadiene, and is then shortstopped. The cement was composed of about 15 weight percent of the elastomer and about 85 percent of the hexane solvent. The elastomer was composed of about 25 weight percent bound styrene and had a vinyl content of about 35 weight percent based upon its polybutadiene content.

Samples of the short stopped elastomer cement were weighed into clean, oven dried 32 ounce (946 ml) bottles as shown in Table 1. Each bottle was then capped with a rubber and Teflon lined metal cap. The materials listed under Stage #1 in Table 1 were subsequently added to the respective bottles.

The telechelic hydroxyl terminated polysiloxane polymer (OH EB 65) used in these experiments was obtained as a liquid from Huls A. G. and used neat without further modification. It had a number average molecular weight (Mn) of about 2000.

The tetraethyl orthosilicate (TEOS) and the dibutyltin dilaurate catalyst used in these experiments were obtained as liquids from Aldrich Chemicals and used neat without further modification.

All manipulations for these experiments were conducted in air. After all of the materials listed under Stage #1 in Table 1 were added, the bottles were agitated for two days in a constant temperature bath set at about 25° C.

The materials listed under Stage #2 in Table 1 where then added for Experiment No. 4. All of the bottles where then agitated for about 2 hours in a constant temperature bath set at about 65° C.

All of the polymer samples for this Example were air dried for about 24 hours and were further dried to constant weight in a vacuum oven.

The SBR elastomer indicated in Table 1 is recited as its dry weight without the hexane solvent, although it was actually used in its cement form.

TABLE 1

| Experiment #1: Control | |
| --- | --- |
| Material | Stage #1 |
| Elastomer(g) | 75 |
| Polysiloxane (g) | 0 |
| Mass Dibutyltin Dilaurate (g) | 0.3581 |
| Volume Dibutyltin Dilaurate (ml) | 0.3359 |

| Experiment #2: TEOS | |
| --- | --- |
| Material | Stage #1 |
| Elastomer (g) | 105 |
| Mass TEOS (g) | 0.6562 |

TABLE 1-continued

| | |
| --- | --- |
| Mol. Weight TEOS (g/mol) | 208.33 |
| Moles TEOS (moles) | 0.003149 |
| Moles $H_2O$ (4x TEOS)(moles) | 0.012596 |
| Mol. Weight $H_2O$ (g/mol) | 18.015 |
| Mass $H_2O$ (g) | 0.2269 |
| 50% of required $H_2O$ (g) | 0.1135 |
| Mass Dibutyltin Dilaurate (g) | 0.3581 |
| Vol. Dibutyltin Dilaurate (mL) | 0.3359 |

| Experiment #3: PDMS/TEOS | |
| --- | --- |
| Material | Stage #1 |
| Elastomer (g) | 105 |
| Polysiloxane (at 15% wt/wt) (g) | 15.75 |
| Mol. Wt. PDMS Polymer (g/mol) | 2,000 |
| Moles PDMS (moles) | 0.007875 |
| Moles TEOS (0.5 × PDMS) (moles) | 0.0039375 |
| 20% Less TEOS (moles) | 0.00315 |
| Mol. Weight TEOS (g/mol) | 208.33 |
| Mass TEOS(g) | 0.6562 |
| Mass Dibutyltin Dilaurate (g) | 0.3581 |
| Vol. Dibutyltin Dilaurate (mL) | 0.3359 |

| Experiment #4: TEOS, PDMS/TEOS | | |
| --- | --- | --- |
| Material | Stage #1 | Stage #2 |
| Elastomer (g) | 105 | |
| Polysiloxane (at 15% wt/wt) (g) | 15.75 | |
| Mol. Wt. PDMS Polymer (g/mol) | 2,000 | |
| Moles PDMS (moles) | 0.007875 | |
| Moles TEOS (0.5 × PDMS) (moles) | 0.0039375 | |
| 20% Less TEOS (moles) | 0.00315 | |
| 20% TEOS ($1^{ST}$ Stage) a(moles) | 0.00063 | |
| Mol. Weight TEOS (g/mol) | 208.33 | |
| Mass TEOS ($1^{st}$ Stage)(g) | 0.1312 | |
| 80% TEOS ($2^{ND}$ State)(moles) | | 0.00252 |
| Mass TEOS ($2^{nd}$ Stage)(g) | | 0.52499 |
| Mass Dibutylin Dilaurate (g) | 0.3581 | |
| Vol. Dibutyltin Dilaurate (mL) | 0.3359 | |

The dried polymer samples from Experiments # 1 through 4 were tested using a Rubber Process Analyzer (RPA). The dried samples were tested using a frequency sweep at 100° C. The strain degree for the frequency sweep was 0.5°. The set frequencies tested (in cycles per minute or "cpm") were 2.0, 5.0, 10.0, 20.0, 50.0, 100.0, 200.0, 500.0, 1000.0, 2000.0. The results, in terms of Frequency versus Tan Delta at 100° C., are shown in the following Table 2.

TABLE 2

| Frequency v. Tan Delta at 100° C. | | | | |
| --- | --- | --- | --- | --- |
| Set Frequency | Exp. #1 | Exp. #2 | Exp. #3 | Exp. #4 |
| 2 | 13 | 13 | 18 | 0 |
| 5 | 5.5 | 6.8 | 4.2 | 5.667 |
| 10 | 3.813 | 3.938 | 3.167 | 3.647 |
| 20 | 2.356 | 2.535 | 2 | 2.255 |
| 50 | 1.194 | 1.206 | 1 | 1.18 |
| 100 | 0.738 | 0.739 | 0.641 | 0.753 |
| 200 | 0.502 | 0.498 | 0.449 | 0.52 |
| 500 | 0.34 | 0.344 | 0.312 | 0.37 |
| 1000 | 0.26 | 0.268 | 0.251 | 0.288 |
| 2000 | 0.21 | 0.213 | 0.191 | 0.235 |

Comments: As it can be seen from Table 2, when the Control (Experiment #1) is compared to Experiment #3, in which PMDS, TEOS, and catalyst were added at the same time, a decrease in the Tan Delta is observed at Set Frequencies between 5 and 2000 cpm.

This is considered herein as being significant because it indicates the SBR host elastomer is being reinforced by the chemistry of the PDMS, TEOS, and catalyst.

As it also can be seen from Table 2, when only TEOS is added, as in Experiment #2, Tan Delta is nearly equal to or higher than the Control.

This is considered herein as being significant because it indicates that TEOS alone is not capable of reinforcing the host elastomer.

It further indicates that the increase in G' that TEOS alone imparts to the host elastomer is more than offset by the increase in G".

The results of testing in terms of Frequency versus Storage Modulus (G') at 100° C. is shown in the following Table 3.

TABLE 3

| Set Frequency | Exp. #1 | Exp. #2 | Exp. #3 | Exp. #4 |
|---|---|---|---|---|
| 2 | 0.76505 | 0.76505 | 0.76505 | 0 |
| 5 | 4.5963 | 3.8253 | 7.6505 | 4.5903 |
| 10 | 12.241 | 12.241 | 18.361 | 13.006 |
| 20 | 34.427 | 32.897 | 47.433 | 35.957 |
| 50 | 106.34 | 107.87 | 133.88 | 106.34 |
| 100 | 181.32 | 184.38 | 206.56 | 173.67 |
| 200 | 244.05 | 248.64 | 263.94 | 231.05 |
| 500 | 310.61 | 315.97 | 328.21 | 296.08 |
| 1000 | 353.45 | 359.57 | 368.76 | 340.45 |
| 2000 | 389.41 | 397.83 | 405.48 | 377.17 |

Comments: As it can be seen from Table 3, when the Control (Experiment #1) is compared to Experiment #3, in which PMDS, TEOS, and catalyst were added at the same time, an increase in G' (Storage Modulus) is observed at Set Frequencies between 5 and 2000 cpm.

This is considered herein to be significant because it indicates that elastic component of the reinforced elastomer has increased due to the chemistry of the PDMS, TEOS and catalyst.

The results of testing in terms of Frequency versus Loss Modulus (G") at 100° C. is shown in the following Table 4.

TABLE 4

Frequency v. Loss Modulus (G') at 100° C.

| Set Frequency | Exp. #1 | Exp. #2 | Exp. #3 | Exp. #4 |
|---|---|---|---|---|
| 2 | 9.9457 | 9.9457 | 13.771 | 11.476 |
| 5 | 25.247 | 26.012 | 32.132 | 26.012 |
| 10 | 46.668 | 48.198 | 58.144 | 47.433 |
| 20 | 81.096 | 83.391 | 94.866 | 81.096 |
| 50 | 127 | 136.06 | 133.88 | 125.47 |
| 100 | 133.88 | 136.18 | 132.35 | 130.82 |
| 200 | 122.41 | 123.94 | 118.58 | 120.11 |
| 500 | 105.58 | 108.64 | 102.52 | 109.4 |
| 1000 | 91.806 | 96.397 | 92.571 | 97.927 |
| 2000 | 81.864 | 84.921 | 77.27 | 88.746 |

Comments: As it can be seen from Table 4, when the Control (Experiment #1) is compared to Experiment #3, in which PMDS, TEOS, and catalyst were added at the same time, a general decrease in G" (Loss Modulus) is observed.

This is considered herein to be significant because it indicates that inelastic component of the reinforced elastomer has decreased due to the chemistry of the PDMS, TEOS and catalyst.

It can also be seen from Table 4 that when only TEOS is added, as in Experiment #2, G" is higher than the Control Experiment #1. This indicates that TEOS alone is not capable of decreasing the inelastic component of the reinforced elastomer.

EXAMPLE 2

Commercially available synthetic high cis-1,4-polyisoprene, obtained as Natsyn 2000 from The Goodyear Tire & Rubber Company, was weighed (13 g) into clean, oven dried, 8 ounce (237 ml) bottles. Dry hexane (180 ml) was added to each bottle, which were then capped with a rubber and Teflon lined metal cap and gently shaken at about 25° C. until the solid polymer dissolved.

After a homogeneous polymer cement was observed in the bottles, the materials listed in Table 5 were added to the bottles.

The telechelic hydroxyl terminated polysiloxane polymer used in this experiment (OH EB 5,000) was obtained as a liquid from Huls A. G. and used neat without further modification. It has a molecular weight (Mn) of about 24,390.

The tetraethyl orthosilicate (TEOS) and dibutyltin dilaurate were obtained and used as in Example I.

The tin 2-ethylhexanoate was obtained as a liquid from United Chemical Technologies and used as a 50 wt % solution in low molecular weight, inert polydimethylsiloxane (not a telechelic hydroxyl terminated polyalkylsiloxane).

All manipulations for this Example 2 were conducted in air.

After all of the materials listed in Table 5 were added, bottles 1,3, 5 through 8, and 13 through 16 were agitated in a constant temperature bath set at about 25° C. Bottles 2, 4, 9 through 12, and 17 through 20 were agitated in a constant temperature bath set at about 65° C. All of the bottles were agitated for four days.

After the four days of agitation, additional TEOS was added to each bottle (45.6 mg). Bottles 1, 3, 5 through 8, and 13 through 16 were then agitated in a constant temperature bath set at about 25° C. Bottles 2, 4, 9 through 12, and 17 through 20 were agitated in a constant temperature bath set at about 65° C. All of the bottles were agitated for an additional four days.

All of the polymer samples of this Example 2 were air dried for 24 hours and were further dried to constant weight in a vacuum oven.

The elastomer is reported on a dry weight basis although it was used in solution.

TABLE 5

| Experiment No. 5: Control | | |
|---|---|---|
| Material | Bottle 1 | Bottle 2 |
| Elastomer (Natsyn 2200) (g) | 13 | 13 |
| Polysiloxane (g) | 0 | 0 |
| Mass Dibutyltin Dilaurate (g) | 0.426 | 0.426 |
| Volume Dibutyltin Dilaurate (mL) | 0.4 | 0.4 |
| Temperature (deg. C.) | 25 | 65 |

| Experiment No. 6: Control | | |
|---|---|---|
| Material | Bottle 3 | Bottle 4 |
| Elastomer (Natsyn 2200) (g) | 13 | 13 |
| Polysiloxane (g) | 0 | 0 |
| Mass Tin 2-ethylhexanoate (g) | 0.244 | 0.244 |
| Volume Tin 2-ethylhexanoate (mL) | 0.219 | 0.219 |
| Temperature (deg. C.) | 25 | 65 |

TABLE 5-continued

Experiment No. 7: PDMS

| Material | Bottle 5 | Bottle 6 | Bottle 7 | Bottle 8 |
|---|---|---|---|---|
| Elastomer (Natsyn 2200) (g) | 13 | 13 | 13 | 13 |
| Polysiloxane (at 20% wt/wt) (g) | 2.60 | 2.60 | 2.60 | 2.60 |
| Mol. Wt. PDMS Polymer (g/mol) | 12,195 | 12,195 | 12,195 | 12,195 |
| Moles PDMS (moles) | 0.0002132 | 0.0002132 | 0.0002132 | 0.0002132 |
| Moles TEOS (.5 × PDMS) (moles) | 0.0001066 | 0.0001066 | 0.0001066 | 0.0001066 |
| 20% Less TEOS | 8.528E-05 | 8.528E-05 | 8.528E-05 | 8.528E-05 |
| Molecular wt TEOS | 208.33 | 208.33 | 208.33 | 208.33 |
| Mass TEOS (g) | 0.0178 | 0.9178 | 0.0178 | 0.0178 |
| Volume TEOS (mL) | 0.019 | 0.019 | 0.019 | 0.019 |
| Mass Dibutyltin dilaurate (g) | 0.0533 | 0.1066 | 0.213 | 0.426 |
| Volume Dibutyltin dilaurate (mL) | 0.05 | 0.1 | 0.2 | 0.4 |
| Temperature (deg. C.) | 25 | 25 | 25 | 25 |

Experiment No. 8: PDMS

| Material | Bottle 9 | Bottle 10 | Bottle 11 | Bottle 12 |
|---|---|---|---|---|
| Elastomer (Natsyn 2200) (g) | 13 | 13 | 13 | 13 |
| Polysiloxane (at 20% wt/wt) (g) | 2.60 | 2.60 | 2.60 | 2.60 |
| Mol. Wt. PDMS Polymer (g/mol) | 12,195 | 12,195 | 12,195 | 12,195 |
| Moles PDMS (moles) | 0.0002132 | 0.0002132 | 0.0002132 | 0.0002132 |
| Moles TEOS (.5 × PDMS) (moles) | 0.0001066 | 0.0001066 | 0.0001066 | 0.0001066 |
| 20% Less TEOS | 8.528E-05 | 8.528E-05 | 8.528E-05 | 8.528E-05 |
| Molecular wt TEOS | 208.33 | 208.33 | 208.33 | 208.33 |
| Mass TEOS (g) | 0.0178 | 0.0178 | 0.0178 | 0.0178 |
| Volume TEOS (mL) | 0.019 | 0.019 | 0.019 | 0.019 |
| Mass Dibutyltin dilaurate (g) | 0.0533 | 0.1066 | 0.213 | 0.426 |
| Volume Dibutyltin dilaurate (mL) | 0.05 | 0.1 | 0.2 | 0.4 |
| Temperature (deg. C.) | 65 | 65 | 65 | 65 |

Experiment No. 9: PDMS

| Material | Bottle 13 | Bottle 14 | Bottle 15 | Bottle 16 |
|---|---|---|---|---|
| Elastomer (Natsyn 2200) (g) | 13 | 13 | 13 | 13 |
| Polysiloxane (at 20% wt/wt) (g) | 2.60 | 2.60 | 2.60 | 2.60 |
| Mol. Wt. PDMS Polymer (g/mol) | 12,195 | 12,195 | 12,195 | 12,195 |
| Moles PDMS (moles) | 0.0002132 | 0.0002132 | 0.0002132 | 0.0002132 |
| Moles TEOS (.5 × PDMS) (moles) | 0.0001066 | 0.0001066 | 0.0001066 | 0.0001066 |
| 20% Less TEOS | 8.528E-05 | 8.528E-05 | 8.528E-05 | 8.528E-05 |
| Molecular wt TEOS | 208.33 | 208.33 | 208.33 | 208.33 |
| Mass TEOS (g) | 0.0178 | 0.0178 | 0.0178 | 0.0178 |
| Volume TEOS (mL) | 0.019 | 0.019 | 0.019 | 0.019 |
| Mass Tin 2-ethylhexanoate (g) | 0.0205 | 0.0611 | 0.122 | 0.244 |
| Volume Tin 2-ethylhexanoate added (mL) | 0.054 | 0.11 | 0.218 | 0.438 |
| Temperature (deg. C.) | 25 | 25 | 25 | 25 |

Experiment No. 10: PDMS

| Material | Bottle 17 | Bottle 18 | Bottle 19 | Bottle 20 |
|---|---|---|---|---|
| Elastomer (Natsyn 2200) (g) | 13 | 13 | 13 | 13 |
| Polysiloxane (at 20% wt/wt) (g) | 2.60 | 2.60 | 2.60 | 2.60 |
| Mol. Wt; PDMS Polymer (g/mol) | 12,195 | 12,195 | 12,195 | 12,195 |
| Moles PDMS (moles) | 0.0002132 | 0.0002132 | 0.0002132 | 0.0002132 |
| Moles TEOS (.5 × PDMS) (moles) | 0.0001066 | 0.0001066 | 0.0001066 | 0.0001066 |
| 20% Less TEOS | 8.528E-05 | 8.528E-05 | 8.528E-05 | 8.528E-05 |
| Molecular wt TEOS | 208.33 | 208.33 | 208.33 | 208.33 |
| Mass TEOS (g) | 0.0178 | 0.0178 | 0.0178 | 0.0178 |
| Volume TEOS (mL) | 0.019 | 0.019 | 0.019 | 0.019 |
| Mass Tin 2-ethylhexanoate (g) | 0.0205 | 0.0611 | 0.122 | 0.244 |
| Volume Tin 2-ethylhexanoate added (mL) | 0.054 | 0.11 | 0.218 | 0.438 |
| Temperature (deg. C.) | 65 | 65 | 65 | 65 |

Results: The dried polymer samples were tested using a Rubber Process Analyzer (RPA). Samples were tested using a frequency sweep at 100° C. The strain degree for the frequency sweep was 0.500. The set frequencies tested (in cycles per minute or "cpm") were 2.0, 5.0, 10.0, 20.0, 50.0, 100.0, 200.0, 500.0, 1000.0, 2000.0.

The results of the testing, in terms of Frequency versus Tan Delta at 100° C., are shown in the following Table 6.

TABLE 6

Frequency v. Tan Delta at 100° C.

| Set Freq. | Bottle 1 | Bottle 5 | Bottle 6 | Bottle 7 | Bottle 8 |
|---|---|---|---|---|---|
| 2 | 0.714 | 0.681 | 0.569 | 0.506 | 0.56 |
| 5 | 0.597 | 0.609 | 0.517 | 0.427 | 0.485 |
| 10 | 0.55 | 0.541 | 0.45 | 0.382 | 0.421 |
| 20 | 0.485 | 0.486 | 0.394 | 0.333 | 0.375 |
| 50 | 0.398 | 0.404 | 0.335 | 0.291 | 0.316 |
| 100 | 0.354 | 0.366 | 0.298 | 0.254 | 0.281 |
| 200 | 0.304 | 0.317 | 0.259 | 0.229 | 0.247 |
| 500 | 0.251 | 0.267 | 0.221 | 0.195 | 0.209 |
| 1000 | 0.224 | 0.246 | 0.206 | 0.164 | 0.193 |
| 2000 | 0.157 | 0.207 | 0.167 | 0.15 | 0.153 |

Comments: As it can be seen from Table 6, when the Control sample (Bottle 1) is compared to samples of Bottles 6 through 8, to which PMDS, TEOS, and increasing amounts of catalyst were added, a decrease in the Tan Delta is observed at Set Frequencies between 2 and 1000 cpm.

This is considered herein as being significant because it indicates the host elastomer, Natsyn 2200 synthetic (high cis-1,4-polyisoprene), is being reinforced by the chemistry of the PDMS, TEOS and catalyst, when the appropriate amount of catalyst is used.

The results of the testing, in terms of Frequency versus Storage Modulus (G') at 100° C., is shown in the following Table 7.

TABLE 7

Frequency v. Storage Modulus (G')

| Set Freq. | Bottle 1 | Bottle 5 | Bottle 6 | Bottle 7 | Bottle 8 |
|---|---|---|---|---|---|
| 2 | 32.132 | 35.957 | 49.728 | 65.029 | 57.379 |
| 5 | 47.433 | 48.963 | 63.09 | 84.156 | 75.74 |
| 10 | 61.204 | 65.029 | 84.921 | 100.22 | 92.571 |
| 20 | 77.27 | 80.331 | 100.99 | 117.05 | 110.17 |
| 50 | 101.75 | 104.05 | 125.47 | 139.24 | 133.12 |
| 100 | 120.88 | 123.17 | 143.83 | 156.84 | 152.25 |
| 200 | 140.77 | 142.3 | 162.19 | 173.67 | 170.61 |
| 500 | 167.55 | 169.08 | 186.67 | 195.85 | 194.32 |

TABLE 7-continued

Frequency v. Storage Modulus (G')

| Set Freq. | Bottle 1 | Bottle 5 | Bottle 6 | Bottle 7 | Bottle 8 |
|---|---|---|---|---|---|
| 1000 | 184.38 | 186.67 | 204.27 | 214.21 | 210.39 |
| 2000 | 204.27 | 203.5 | 220.34 | 224.16 | 225.69 |

Comments: As it can been seen from Table 7, when the control sample (Bottle 1) is compared to samples of Bottles 5 through 8, to which PMDS, TEOS, and increasing amounts of catalyst were added, an increase in G' (Storage Modulus) is observed at Set Frequencies between 2 and 1000 cpm.

This is considered herein as being significant because it indicates that the elastic component of the host elastomer, Natsyn 2200 synthetic (high cis-1,4-polyisoprene), has increased due to the chemistry of the PDMS, TEOS, and catalyst, when the appropriate amount of catalyst is used.

The results of testing, in terms of Frequency versus Loss Modulus (G") at 100° C., is shown in the following Table 8.

TABLE 8

Frequency v. Loss Modulus (G") at 100° C.

| Set Freq. | Bottle 1 | Bottle 5 | Bottle 6 | Bottle 7 | Bottle 8 |
|---|---|---|---|---|---|
| 2 | 22.952 | 24.482 | 28.307 | 32.897 | 32.132 |
| 5 | 28.307 | 29.837 | 35.192 | 35.957 | 36.723 |
| 10 | 33.662 | 35.192 | 38.253 | 38.253 | 39.018 |
| 20 | 37.488 | 39.018 | 39.783 | 39.018 | 41.313 |
| 50 | 40.548 | 42.078 | 42.078 | 40.548 | 42.078 |
| 100 | 42.843 | 45.138 | 42.843 | 39.783 | 42.843 |
| 200 | 42.843 | 45.138 | 42.078 | 39.783 | 42.078 |
| 500 | 42.078 | 45.138 | 41.313 | 38.253 | 40.548 |
| 1000 | 41.313 | 45.903 | 42.078 | 35.192 | 40.548 |
| 2000 | 32.132 | 42.048 | 36.723 | 33.662 | 34.427 |

Comments: As it can be seen from Table 8, when the control samples (Bottle 1) is compared to samples of Bottles 5 though 8, to which PMDS, TEOS, and increasing amounts of catalyst were added, a decrease in G" (Loss Modulus) is observed at Set Frequencies between 50 and 10000 cpm.

This is considered herein as being significant because it indicates that the inelastic component of the host elastomer, Natsyn 2200 synthetic (high cis-1,4-polyisoprene), as decreased due to the chemistry of the PDMS, TEOS, and catalyst, when the appropriate amount of catalyst is used.

While certain representative embodiments and details have been shown for the purpose of illustrating the invention, it will be apparent to those skilled in this art that various changes and modifications may be made therein without departing from the spirit or scope of the invention.

What is claimed:

1. A method of preparing an elastomer/reinforcement system composite, said reinforcement system being formed in the absence of silica in situ within an elastomer host, which comprises:
   (A) blending in an organic solvent solution of an elastomer host,
      (1) at least one telechelic hydroxy and/or alkoxy terminated polysiloxane,
      (2) at least one reticulating agent having a moiety which comprises at least two alkoxy groups, and
      (3) a catalytic amount of a catalyst to promote a reaction between said polysiloxane and said reticulating agent; allowing a catalyzed reaction to initiate and proceed between said polysiloxane and said reticulating agent within said elastomer host and to thereby form a reinforcement system for said elastomer host; and recovering said resulting composite; or
   (B) blending, in an internal rubber mixer containing said elastomer host,
      (1) at least one telechelic hydroxy and/or alkoxy terminated polysiloxane
      (2) at least one reticulating agent having a moiety which comprises at least two alkoxy groups, and
      (3) a catalytic amount of a catalyst to promote a reaction between said polysiloxane and said reticulating agent; allowing a catalyzed reaction to initiate and proceed between said polysiloxane and said reticulating agent within said elastomer host and to thereby form a reinforcement system for said elastomer host; and recovering said resulting composite; wherein said elastomer host is selected from at least one hydrocarbon conjugated diene-based elastomer; wherein said telechelic hydroxyl and/or alkoxy terminated polysiloxane is represented by the following general Formula (I):

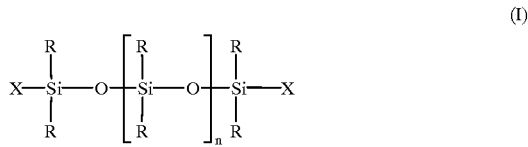

(I)

wherein R is the same or different alkyl radical selected from methyl, ethyl, n-propyl, isopropyl, n-butyl, and isobutyl radicals; wherein X is the same or different radical selected from hydroxyl and OR' (alkoxy) radicals, wherein R' is selected from methyl, ethyl, n-propyl, isopropyl, n-butyl, isobutyl radicals, and phenoxy radicals, where in R' is represented as $C_6H_{5-m}R''_m$, wherein R" is a radical selected from methyl ethyl, n-propyl, isopropyl, n-butyl, and isobutyl; wherein m is from zero to five; and wherein n is zero or a number of from 2 to 500, alternatively from 1 to 200; said reticulating agent having a moiety comprised of at least two alkoxy groups is of at least one of the general formulas (IIA),(IIB),(IIC), (II), (IV) and (V):

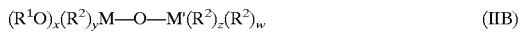

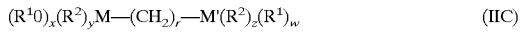

wherein M and M' are the same or different and are selected from silicon, titanium, zirconium, boron, and aluminum, where $R^1$ and $R^2$ are individually selected from radicals having from 1 to 10 carbon atoms, as alkyl radicals having from one to four carbon atoms and a phenyl radical; wherein the sum of each of x+y and w+z integers is equal to 3 or 4 depending upon the valence of the associated M or M', as the case may be and is, therefore, 4 except when its associated M or M' is boron or aluminum for which it is 3, and wherein r is from 1 to 15;

wherein j is a number in a range of from 2 to about 8 and the average for j is in a range of (A) about 2 to about 2.6 or (B) about 3.5 to about 4.5;

wherein Z is represented by the following formulas:

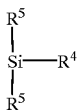 (Z1)

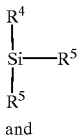 (Z2)

and

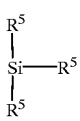 (Z3)

wherein $R^4$ is the same or different radical and is individually selected from alkyl radicals having 1 to 4 carbon atoms and phenyl radical; $R^5$ is the same or different alkoxy groups wherein the alkyl radicals of the alkoxy group(s) are individually selected from alkyl radicals having 1 to 4 carbon atoms;

$$(OR^6)_3\text{—Si—}R^7 \quad (IV)$$

where $R^6$ is the same or different radicals alkyl radicals having from 1 to 4 carbon atoms selected from methyl, ethyl, n-propyl, and isopropyl radicals and as a phenyl radical, $R^7$ is selected from alkyl radicals having from 1 to 18 carbon atoms and aryl radicals or alkyl substituted aryl radicals having from 6 to 12 carbon atoms; and $$(OR^8)_3\text{—Si—}(CH_2)_y\text{—Y} \quad (V)$$

wherein $R^8$ is the same or different alkyl radicals having from 1 to 4 carbon atoms selected from methyl, ethyl, n-propyl, and isopropyl radicals, y is an integer of from 1 to 12 and Y is selected from at least one of primary amino, mercapto, epoxide, thiocyanato, vinyl, methacrylate, ureido, isocyanato, and ethylene diamine radicals; and catalyst of the general formula VI or VII:

$$Sn[Q(C(R^x))_a(C(H)_cH)_b(C(O))_dR^y]_2 \quad (VI)$$

wherein:
A. where Q is oxygen, a and b are zero, d is equal to one and $R^y$ is an alkyl radical containing from one to 25 carbon atoms;
B. where Q is oxygen and both a, b, and d are equal to one, c is zero and $R^x$ is the same or different as $R^y$, and $R^x$ equals hydrogen, methyl, $CF_3$, propyl butyl and/or phenyl radicals;
C. where Q is sulfur, a is zero and b, c, and d are one, and $R^y$ is an alkyl radical containing from one to 25 carbon atoms;
D. where Q is oxygen or sulfur, a, b, and d are zero and $R^y$ is an alkyl radical containing from one to 25 carbon atoms;

$$R^z_2Sn[Q(C(R^x))_a(C(H)_cH)_b(C(O))_dR^y]_2 \quad (VII)$$

wherein $R^z$ is an alkyl radical containing from one to 25 carbon atoms.

2. The method of claim 1 wherein said polysiloxane is a telechelic hydroxy terminated polysiloxane.

3. The method of claim 2 where, for said Formula (I), X is the same or different radical selected from hydroxyl and OR' (alkoxy) radicals, preferably hydroxyl radicals, wherein R' is selected from methyl, ethyl, n-propyl, isopropyl, n-butyl, and isobutyl radicals, preferably methyl radicals, and phenoxy radicals, where in R' is represented as $C_6H_{5-m}R''_m$, wherein R'' is a radical selected from methyl ethyl, n-propyl, isopropyl, n-butyl, and isobutyl; wherein m is from zero to five.

4. The method of claim 1 wherein said polysiloxane is a telechelic alkoxy terminated polysiloxane.

5. The method of claim 4 where, for said Formula (I), X is the same or different radical selected from hydroxyl and OR' (alkoxy) radicals, preferably hydroxyl radicals, wherein R' is selected from methyl, ethyl, n-propyl, isopropyl, n-butyl, and isobutyl radicals, preferably methyl radicals, and phenoxy radicals, where in R' is represented as $C_6H_{5-m}R''_m$, wherein R'' is a radical selected from methyl ethyl, n-propyl, isopropyl, n-butyl, and isobutyl; wherein m is from zero to five.

6. The method of claim 1 which comprises blending in an organic solvent solution of an elastomer host,
(1) at least one of said telechelic hydroxy and/or alkoxy terminated polysiloxane,
(2) at least one of said reticulating agent having a moiety which comprises at least two alkoxy groups, and
(3) a catalytic amount of a catalyst to promote a reaction between said polysiloxane and said reticulating agent; allowing a catalyzed reaction to initiate and proceed between said polysiloxane and said reticulating agent within said elastomer host and to thereby form a reinforcement system for said elastomer host; and recovering said resulting composite.

7. The method of claim 1 which comprises blending, in the absence of silica, in an internal mixer containing said elastomer host,
(1) at least one of said telechelic hydroxy and/or alkoxy terminated polysiloxane,
(2) at least one of said reticulating agent having a moiety which comprises at least two alkoxy groups, and
(3) a catalytic amount of a catalyst to promote a reaction between said polysiloxane and said reticulating agent; allowing a catalyzed reaction to initiate and proceed between said polysiloxane and said reticulating agent within said elastomer host and to thereby form a reinforcement system for said elastomer host; and recovering said resulting composite; wherein said elastomer host is selected from at least one hydrocarbon conjugated diene-based elastomer.

8. The method of claim 1 wherein the materials of Formula VI are of the representative formulas:

| | |
|---|---|
| $Sn(OC(O)R)_2$ | VI-A: |
| $Sn(SCH_2C(O)R)_2$ | VI-B: |
| $Sn(OR)_2$ | VI-C:. |

9. The method of claim 1 wherein the materials of Formula VII are of the representative formulas:

| | |
|---|---|
| $R_2Sn(OC(O)R)_2$ | VII-A: |

$$R_2Sn(SCH_2C(O)R)_2 \quad \text{VII-B:}$$

$$R_2Sn(OR)_2 \quad \text{VII-C:.}$$

10. The method of claim 1 wherein the materials of Formula VI and VII are selected from bis(2-ethylhexanoate) tin, bis(neodecanoate)tin, diacetoxytin, di-n-butylbis(2-ethylhexanoate)tin, di-n-butylbis(2,4-pentanedionate)tin, di-n-butyldiacetoxytin, di-n-butyldiacrylatetin, di-n-butyldilauryltin, di-n-butyldimethacrylatetin, dimethyldineodecanoatetin, dioctyldilauryltin, dioctyldineodecanoatetin, stannous acetate, tin II hexafluoropentanedionate, and tin II 2,4-pentanedionate.

11. The process of claim 1 wherein about 5 to about 40 phr of a starch/plasticizer composite having a softening point in a range of about 110° C. to about 160° C. is blended with said elastomer/reinforcement system at a temperature in a range of about 130° C. to about 150° C.

12. An elastomer/reinforcement system prepared according to the process of claim 1.

13. An elastomer/reinforcement system prepared according to the process of claim 11.

14. An elastomer blend composition comprised of at least two diene-based elastomers of which one elastomer is the pre-formed elastomer/reinforcement system composite of claim 12 comprised of, based on 100 phr of elastomers, (A) about 10 to about 90 phr of at least one diene-based elastomer selected from at least one homopolymer and copolymer of isoprene and 1,3-butadiene and copolymer of at least one diene selected from isoprene and 1,3-butadiene with a vinyl aromatic compound selected from at least one of styrene and alpha-methylstyrene, preferably styrene, (B) about 90 to about 10 phr of at least one of said pre-formed composite of elastomer/filler, (C) at least one of additional reinforcing filler provided, however, that the total of said in-situ formed filler and said additional reinforcing filler are present in an amount of from about 30 to about 120 phr and where said additional reinforcing filler may be selected, for example, from at least one of precipitated silica, aluminosilicate, carbon black and modified carbon black having hydroxyl groups, e.g.: hydroxyl and/or silicon hydroxide groups, on its surface and (D) optionally a coupling agent having a moiety reactive with said filler(s) and another moiety interactive with said elastomer(s).

15. An article having at least one component comprised of the elastomer/reinforcement system of claim 12.

16. An article having at least one component comprised of the elastomer/reinforcement system of claim 13.

17. The article of claim 15 wherein said article is selected from industrial belts and hoses.

18. The article of claim 16 wherein said article is selected from industrial belts and hoses.

19. A tire having at least one component comprised of the elastomer/reinforcement system of claim 12.

20. A tire having at least one component comprised of the elastomer/reinforcement system of claim 13.

21. A tire having at least one component comprised of the composition of claim 14.

22. A tire having a tread comprised of the elastomer/reinforcement system of claim 12.

23. A tire having a tread comprised of the elastomer/reinforcement system of claim 13.

24. A tire having a tread comprised of the composition of claim 14.

* * * * *